(12) United States Patent
De Menezes et al.

(10) Patent No.: US 10,172,217 B2
(45) Date of Patent: Jan. 1, 2019

(54) METHOD FOR CONFIGURING AN ELECTRONIC ELEMENT IN A LIGHTING SYSTEM, ELECTRONIC ELEMENT AND CONFIGURING SYSTEM

(71) Applicant: TRIDONIC GMBH & CO KG, Dornbirn (AT)

(72) Inventors: Cristiano De Menezes, Durham (GB); Ian Wilson, Sunderland (GB)

(73) Assignee: TRIDONIC GMBH & CO KG, Dornbirn (AT)

(*) Notice: Subject to any disclaimer, the term of this patent is extended or adjusted under 35 U.S.C. 154(b) by 0 days.

(21) Appl. No.: 15/554,083

(22) PCT Filed: Mar. 4, 2016

(86) PCT No.: PCT/AT2016/050052
§ 371 (c)(1),
(2) Date: Aug. 28, 2017

(87) PCT Pub. No.: WO2016/138549
PCT Pub. Date: Sep. 9, 2016

(65) Prior Publication Data
US 2018/0042091 A1 Feb. 8, 2018

(30) Foreign Application Priority Data

Mar. 4, 2015 (GB) .................................. 1503687.4
Mar. 19, 2015 (GB) .................................. 1505005.7

(51) Int. Cl.
*G05B 19/02* (2006.01)
*H05B 37/02* (2006.01)
(Continued)

(52) U.S. Cl.
CPC ..... *H05B 37/0272* (2013.01); *G06K 7/10297* (2013.01); *G06K 7/1417* (2013.01); *H05B 37/0245* (2013.01); *Y02B 20/48* (2013.01)

(58) Field of Classification Search
CPC ............... H04W 4/008; H05B 37/0245; H05B 37/0272
(Continued)

(56) References Cited

U.S. PATENT DOCUMENTS 7,355,523 B2 * 4/2008 Sid ..................... H05B 37/0272
315/312
2009/0237006 A1 * 9/2009 Champion ......... H05B 33/0857
315/297
(Continued)

FOREIGN PATENT DOCUMENTS

EP 1784061 5/2007
EP 2908469 8/2015
(Continued)

OTHER PUBLICATIONS

UK search report in priority application GB1505005.7 dated Sep. 15, 2015.
(Continued)

*Primary Examiner* — Thuy Vinh Tran
(74) *Attorney, Agent, or Firm* — Andrus Intellectual Property Law (57) ABSTRACT

A method for configuring an electronic element (e.g., a ballast) in a lighting system prior to powering up the lighting system uses a wireless communication interface in the electronic element based on near field communication or radio frequency identification communication. An external configuring device, such as a programmed smartphone or tablet, is equipped with a wireless communication module and transmits configuration data to the wireless communication interface which in turn writes the data to memory in the electronic element without power being supplied to the electronic element. The control for the electronic element reads the configuration when it is powered up.

5 Claims, 7 Drawing Sheets

(51) Int. Cl.
*G06K 7/10* (2006.01)
*G06K 7/14* (2006.01)

(58) Field of Classification Search
USPC .............................. 700/2; 340/4.3, 4.32, 4.33
See application file for complete search history.

(56) References Cited

U.S. PATENT DOCUMENTS

| | | |
|---|---|---|
| 2010/0238001 A1 | 9/2010 | Veskovic |
| 2011/0095709 A1* | 4/2011 | Diehl .................... F21V 23/04 |
| | | 315/363 |
| 2014/0239816 A1 | 8/2014 | Lee et al. |

FOREIGN PATENT DOCUMENTS

| | | |
|---|---|---|
| WO | 2013164251 | 11/2013 |
| WO | 2014126470 | 8/2014 |
| WO | 2014175731 | 10/2014 |

OTHER PUBLICATIONS

International Search Report and Written Opinion in parent PCT Application PCT/AT2016/050052 dated Aug. 12, 2016.

\* cited by examiner

| Data | Size (Bytes) |
|---|---|
| String of validation | 8 |
| Group | 2 |
| Scene | 16 |
| Power on level | 1 |
| System failure level | 1 |
| Maximum level | 1 |
| Minimum level | 1 |
| Fade rate | 1 |
| Fade time | 1 |
| Random address | 3 |
| Short address | 1 |
| X location in cm (0 to 655.35m) | 2 |
| Y location in cm (0 to 655.35m) | 2 |
| Building plan serial number | 2 |
| Checksum | 1 |
| Total | 43 |

Fig. 10

| Byte | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| Description | Validation string | | | | | | | | Group | | Scene memory [0:15] | | | | | | | | | | | | | | | |
| Example (hex) | 54 | 52 | 49 | 44 | 4F | 4E | 49 | 43 | 00 | 01 | FF | 7F | 3F | 10 | 00 | FF | FF | FF | FF | FF | FF | FF | FF | FF | FF | FF |

Fig. 11

| Byte | 27 | 28 | 29 | 30 | 31 | 32 | 33 | 34 | 35 | 36 | 37 | 38 | 39 | 40 | 41 | 42 | 43 |
|---|---|---|---|---|---|---|---|---|---|---|---|---|---|---|---|---|---|
| Description (contd.) | Power on level | System fail level | Max level | Min level | Fade rate | Fade time | Random address [2:0] | | | Short address | X coordinate | | Y coordinate | | Building plan ID | | Checksum |
| Example (hex) | FF | FF | FF | 00 | 02 | 02 | 4F | DE | 30 | 2A | 03 | E8 | 01 | F4 | 00 | 01 | 78 |

…

METHOD FOR CONFIGURING AN ELECTRONIC ELEMENT IN A LIGHTING SYSTEM, ELECTRONIC ELEMENT AND CONFIGURING SYSTEM

CROSS REFERENCE TO RELATED APPLICATION

The present application is the U.S. national stage application of International Application PCT/AT2016/050052, filed Mar. 4, 2016, which international application was published on Sep. 9, 2016 as International Publication WO 2016/138549 A1. The International Application claims priority to Great Britain Patent Applications 1503687.4 filed Mar. 4, 2015 and 1505005.7 filed Mar. 19, 2015.

FIELD OF THE INVENTION

The invention relates to a method for configuring an electronic element in a lighting system. The invention further relates to an electronic element. The invention further relates to a configuring system for a lighting system. The invention further relates to a housing for an electronic element. The invention further relates to a method for sending configuration information. The invention further relates to a computer program product for a configuring device of a configuring system.

BACKGROUND OF THE INVENTION

Nowadays lighting systems for buildings do not only comprise a lighting system that is switched by a wall switch. Nowadays lighting systems comprises intelligent electronic elements. Furthermore control units are used, which are configured to control, and/or to monitor and/or to maintain the electronic elements and the lighting means. This allows a high functionality of the lighting system, for instance different dimming scenarios, different coloring, different light fading and also an emergency function.

The drawback of such an intelligent lighting system is the increasing effort to commission and to maintain such a lighting system, which inherently leads to an increase of time that is needed for the commissioning of such lighting systems.

Another drawback is that each specific electronic element in the lighting system needs to be configured manually, which due to the number of such electronic elements is time-consuming and error prone.

Another drawback of the existing lighting systems is the need that the lighting system has to be powered in order to configure the electronic element. Thus, the commissioning cannot start before the installation phase of the lighting system is finished. Therefore, the installation state of the lighting system has to be finished first and it is impossible to install and commission a lighting system in parallel.

There is a need to decrease the effort and the time that is used for commissioning of a lighting system. Especially, an easier way to configure the electronic elements in a lighting system has to be found.

The above identified problems are solved by the technical features described herein.

SUMMARY OF THE INVENTION

The above identified problems are solved by a method for configuring an electronic element, such as a ballast, in a lighting system. The method comprises the steps of: retrieving configuration information from a machine-readable medium by means of a configuring device; sending the retrieved configuration information from the configuring device to the electronic element in the lighting system; and storing the configuration information into an information storage means of the electronic element in the lighting system.

Advantageously, the configuring of the said electronic element is done electronically instead of manually configuring the electronic element. This leads to an easy handling without a time consuming commissioning.

Preferably, in the sending step a bidirectional channel of a wireless communication interface, especially based on a near field communication or a radio frequency identification communication between the configuring device and the electronic element is established. The near-field communication, short: NFC, is standardized by ISO 14443, ISO 18092, ISO 21481, ECMA-340, ECMA-352, ECMA-356, ECMA-362 or ETSI TS 102 190. The radio-frequency identification, short: RFID, is especially standardized in ISO/IEC 18000-X.

It is also possible to use alternative types of wireless communication interfaces, e.g. mobile device like a smartphone or tablet PC may use a wireless booster system where a signal coming from the audio jack output or USB connector is transmitted to a wireless communication.

If the configuration information is sent wirelessly, it is unnecessary to plug and to unplug the configuring device to an input terminal of the electronic element. Furthermore, the electronic element does not have to be physically contacted, which especially is helpful in areas where the electronic element is difficult to access, for instance on a ceiling or behind a cover panel or an intermediate partition in a wall of the building.

Preferably the configuration information is retrieved from a lighting system map, where a building plan or an installation plan or the like in combination with the at least one electronic element is drawn. Such building plans are printed and comprise the machine-readable medium, such as a QR-code or NFC-tag or the like, which can easily be read by the configuring device. Preferably, the lighting system map is digitized and displayed on a screen of a portable computer device, such as a tablet-PC or the like.

Preferably the method is applied in an unpowered state of the electronic element, preferably in an unpowered state of the lighting system. Therefore, the configuring device comprises an autarkic power supply and is configured to store the configuration information into the information storage means without an additional voltage supply derived from the lighting system. Thus, the installation phase of the lighting system does not have to be finished and a configuration of parts of the lighting system is possible in parallel to the installation of the lighting system. An offline commissioning method is therefore achieved.

In a preferred embodiment, the lighting system or at least the electronic element is powered after the storing step and the configuration information are read from the information storage means of the electronic element to configure the electronic element. This is mainly achieved after finishing the installation of the lighting system, so that the lighting system is ready to be powered-up. During the first powering of the lighting system, the configuration information is detected in the information storage unit and is read out of the information storage means of the specific electronic element. After read-out, those configuring information is installed and/or used in the individual electronic elements. This embodiment has the further advantage that an archive function is obtained.

Whenever the electronic element fails to operate, a simple restart and reconfiguring of the electronic element is possible using the information storage means of the electronic elements in which the configuration information are stored into.

In a preferred embodiment, a lighting system failure is determined and upon determination of the system failure, the configuration information is again read from the information storage means of each electronic element to reconfigure the electronic element.

In a preferred embodiment, the configuration information is operational parameters for the electronic element, such as voltage information, at which the electronic element should be operated, temperature information, on which the electronic element is to switch, running cycle information, on which the electronic element is to be maintained or updated, dimming parameter information and/or fade parameter information.

In another preferred embodiment, the configuration information is system-relevant information, such as address information, needed to contact the electronic element or a lighting group information, to define, which lighting mean is specifically controlled by which electronic element.

Additionally the configuration information may comprise service information such as lighting means type, load type or battery type.

Additionally positioning values of each electronic element can also be stored into the electronic elements storage means in order to mark the device on an electronic lighting system map to allow an easier locating of the electronic element.

Advantageously, the electronic element can be installed without configuration information. The configuration information are read from a machine readable medium in an easy manner and are provided to the electronic elements storage unit subsequent or in parallel to the installation procedure. An easy installation and commissioning of the lighting system is therefore achieved.

The above identified problems are further solved by an electronic element in a lighting system comprising a communication interface for receiving configuration information from an external configuration device. The electronic element further comprises an information storage means for storing the received configuration information. The electronic element at least comprises a controlling unit for generating control signals for at least a light source. The communication interface of the electronic element comprises a wireless communication interface for receiving the configuration information via an over-the-air communication technique, such as NFC and/or RFID.

The communication interface is configured to receive information from an external configuration device and a information storage means is used for storing the received configuration information. Thus, a commissioning of the electronic element and the configuration of the electronic element can be achieved in an unpowered mode of the electronic element.

The configuring device is able to write and read information stored in the information storage means in an unpowered mode of the electronic element. The configuring device may power the electronic element through wireless transmission of energy, e.g. by radio-frequency or inductive coupling. Therefore a commissioning of a lighting system in parallel to the installation of the lighting system is possible, which saves time and reduces effort.

Preferably, the received configuration information are provided to a control unit of the electronic element via a wired communication channel. This wired communication channel might be an Inter-Integrated communication, short: $I^2C$, which is a multi-master, multi-slave, single-ended, serial computer bus used for attaching low-speed peripherals to electronic systems. It can be used for a communication between the wireless interface and the control unit of the electronic element. Using this wired communication channel, a configuration of the electronic element can be achieved in a powered state after completion of the installation phase of the lighting system by reading the stored configuration information.

Thus, the provisioning of configuration information to each electronic element can be obtained in a depowered mode of the lighting system, wherein the finalization of the configuration is automatically achieved after powering the lighting system.

In a preferred embodiment, the electronic element is an active electronic element for supplying voltage to the light source and for controlling at least the one light source. Thus, the electronic element is for instance a driver or ballast of a lighting means or a driving circuit or the like. The active electronic element comprises a driving unit configured to drive the at least one lighting means. Such an active electronic element might comprise a fly-back converter technology to efficiently drive the specific lighting means. Such active electronic elements might be an emergency converter module further comprising or being connected to an energy storage means for supplying energy to a lighting means or an emergency lighting means in an emergency case.

In another embodiment the electronic element further comprises another information interface for obtaining control commands. Such another information interface might be a digital addressing lighting interface, short DALI, to monitor and maintain each specific active electronic element. Via the control commands the status of each electronic element can be read out and further adjustments to the configuration information can be achieved.

In an alternative embodiment the electronic element is a passive electronic element, especially a sensing means, such as a photocell or infrared detection means or a switching means such as an electronic wall switch or a dimming unit or the like. These passive electronic elements are equipped with a communication interface to access an information storage means for storing configuration information sent by a configuring device of the lighting system. Therefore, each electronic element is commissioned in an unpowered mode of the lighting system.

The above identified problems are further solved by a configuring system of a lighting system which comprises an electronic element as previously stated for controlling a lighting means. The configuring system further comprises a configuring device configured to retrieve configuration information for the electronic element from a machine-readable medium.

The machine-readable medium is for instance a quick response code, short QR-code, especially a one-dimensional bar code or a two-dimensional bar code. Those machine-readable media are easily printed on paper or can be provided via electronic lighting maps, e.g. provided on a screen of a handheld tablet device. Those machine-readable media contain the configuration information which can easily be retrieved from the configuring device.

In a preferred embodiment, the machine-readable media is an electronic token, such as a NFC tag or an RFID tag or a USB token. Since the configuring device might be equipped with a wireless communication interface a NFC or RFID interface is already contained into the configuring device. This NFC or RFID interface can advantageously be used to retrieve the configuration information.

In a preferred embodiment, the machine-readable medium is a part of a digitized lighting system map, which incorporates the configuration information of each electronic element and the position information of this specific electronic element. Such a digitized lighting system map can be obtained from a server station and downloaded via specific interfaces to an electronic device, such as a portable computer. This lighting system map is then displayed and the configuration information can be retrieved thereof. An electronic overview of the lighting system is therefore obtained, which is easily updateable and can be used to navigate through the building to the specific electronic element in order to send the configuration information thereto.

Preferably, the configuring device is a commissioning tool, which is used to configure the at least one electronic element during a commissioning state of the lighting system. Such a commissioning tool might be used by a commissioner or an installer of the lighting system and comprises a wireless communication interface to send the configuration information to the electronic element.

In a more preferred embodiment, the configuring device is a handheld device, especially a configured smart phone or a configured tablet PC or a configured portable computer. Nowadays smart phones and tablet PCs comprise a variety of communication interfaces, such as NFC, WLAN, USB or the like. Those smart phones and tablet PCs can be configured with a computer program, such as a commissioning application to allow a commissioning of the lighting system in a depowered state of the lighting system.

In case the commissioning device is originally not equipped with a wireless communication interface, e.g. NFC or RFID, it is upgraded with an additional wireless communication module. Such modules comprise wired communication interfaces to connect the module with the configuring device. Those wired communication interfaces are audio phone connectors or USB or the like. Thus, a wireless communication can be established between the configuring device and the electronic element also in case the configuring device is not equipped with an internal wireless communication interface.

In a more preferred embodiment, the configuring device obtains the configuration information from the machine-readable medium by operating an optical interface, especially a camera or a scanning element.

Alternatively, the configuration device retrieves the configuration information from the machine-readable medium by operating an electronic interface, especially a wireless communication interface.

The light source configuring system is capable of configuring a plurality of lighting means. Especially the plurality of lighting means can be grouped into at least two different groups of luminaries. Those light groups can be organized per room, per floor and/or per booth. The grouping information is a part of the configuration information.

The housing for an electronic element may comprise a metallic case configured to shield the electronic element. The shielding prevents an external electromagnetic radiation to electronically disturb the electronic element. Additionally, the shielding prevents other electronic devices to get disturbed by electromagnetic radiation, generated by the electronic element.

The housing may further comprise a wireless electronic interface configured to retrieve configuration information from the configuring device, wherein an antenna is used to receive over-the-air signals coded with the configuration information, wherein the antenna is arranged horizontally or vertically to the metallic case.

Preferably the above identified problems are solved by a method for sending configuration information in a lighting system using a configuring device. The method comprises the steps of: retrieving configuration information from a machine-readable medium; and sending the retrieved configuration information from the configuring device to an information storage means of an electronic element via a communication interface of the configuring device.

The retrieved configuration information is displayed on a display screen of the configuring device to be validated.

The electronic element is selected by the configuring device if the configuring device is in communication vicinity of the electronic element. In case more than one electronic element is in close vicinity to the configuring device, the user manually selects one specific electronic element, which should be configured. Alternatively, the electronic element identifies itself with identification information, which is verified by the configuring device for an automatic selection of the desired electronic element.

In a preferred embodiment, the configuring device checks the information integrity during the retrieving method step, wherein the configuring device displays an error message in case the information integrity check fails.

An automatic resending of the configuration information is used in case a sending failure occurs.

The configuring device receives an error code in case the sent configuration information is not stored correctly in the electronic element.

In a preferred embodiment the configuring device displays a success message in case the sent configuration information is stored correctly in the electronic element.

The above identified problems are further solved by a computer program product for a configuring device of a lighting system, the configuring device comprises means for subsequently executing the previously stated configuring method steps in a computer program.

Preferably a graphical user interface, short GUI, is used to display a digitized lighting system map. Such a GUI allows an easy handling and a convenient commissioning of the lighting system.

Preferably the lighting system map is obtained from a server station or a quick response code or a downloaded file.

The lighting system map incorporates positioning information of each electronic element. Therefore the electronic element is bundled with a specific coordinate in the map.

The sent configuration information to each specific electronic element is displayed in the lighting system map. This allows an easy way to find the configuration information without manually walking to the specific electronic element.

The positioning information of the electronic element is sent to the electronic element. This is mainly done during commissioning of the lighting system, wherein the electronic element is programmed with positioning to be found later.

The computer program product comprises an operating system of the configuring device which is an Android operating system or Apple IOS operating system etc.

The information which can be written into the information storage means can be updated system information when a modified commissioning is running.

Following exemplary embodiments of the invention are described with reference to the drawings. Those exemplary embodiments do not limit the scope of the invention. The same reference signs in different drawings indicate same elements or at least same functions unless otherwise stated.

DETAILED DESCRIPTION

Figure 1:
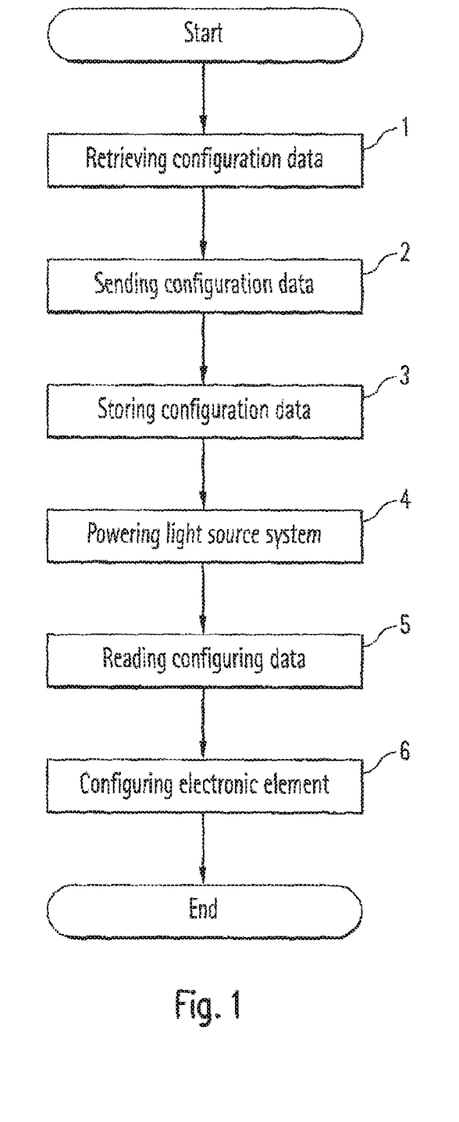
FIG. 1 shows a first exemplary embodiment of a method for configuring an electronic element in a lighting system according to the invention.

FIG. 1 shows a first exemplary embodiment of a method for configuring an electronic element 11 in a lighting system 9. Therein a retrieving step 1 is used to retrieve configuration information from a machine-readable medium 13. Such configuration information are for instance contained in a machine-readable optical label such as quick response code, short QR code according to FIG. 4 or an alternative type of barcode.

Upon retrieving 1 the configuration information, those information are sent in a sending step 2 to the information storage means 120 of an electronic element 11. In the information storage means 120 those configuration information are stored according to the storing step 3. Subsequently, the lighting system 9 is powered in a powering step 4. Upon powering the lighting system 9, the configuration information are read from the information storage means 120 in reading step 5. Subsequently, the configuring of the electronic element 11 occurs in the configuring step 6.

QR codes 13 are used to store the configuration information. A configured smart phone or similar commissioning device is used as a configuring device 12 to retrieve 1 the configuration information and send those configuration information to the electronic element 11, especially to an information storage means 120, which is reached a communication interface 110.

Additionally, that configuration information can be digitally stored to a digitized lighting system map 14. The specific electronic element 11 is shown as an icon in the digitized lighting map 14, which denotes the specific lighting means 10 and the configuration information which have to be used to configure the electronic element 11. It is beneficial that the complete configuration information for each lighting means 10 can be sent even before the system 9 is powered. Therefore a fast and efficient commissioning is possible without an extra commissioning engineer who commissions the lighting system 9 in an inconvenient manner. The configuring of the lighting system can be done by the installer of the lighting system 9 before finishing the installation procedure of the whole lighting system 9.

Figure 2:
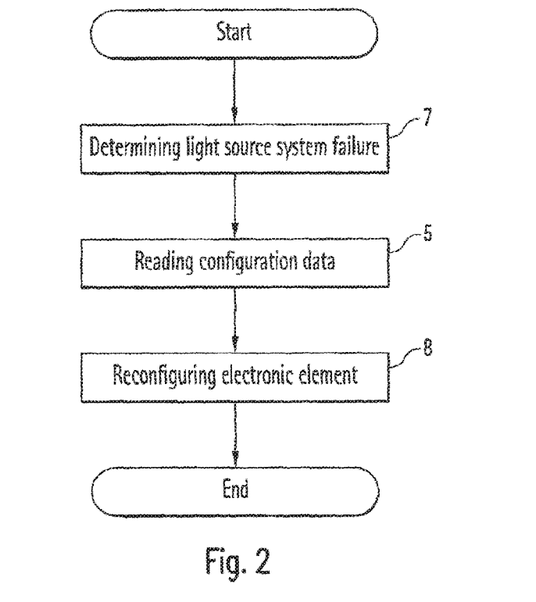
FIG. 2 shows a second exemplary embodiment of a method for configuring an electronic element in a lighting system according to the invention.

According to FIG. 2, a second exemplary embodiment of the method for configuring an electronic element 11 in a lighting system 9 is shown. Therein a determining step 7 is shown which incorporates the determination of a lighting system failure. Whenever the determination step 7 occurs, the configuration information are read in reading step 5 and a reconfiguring 8 of the electronic element 11 can be done easily.

Thus, another benefit is included, since now the ability to easily read the configuration information from a failed electronic element 11 in order to reconfigure the electronic element 11 in an identical manner is obtained. This is achieved by using the information storage means 120 of the electronic element 11 as an archive for configuration information. Whenever the electronic element 11 fails to operate, the electronic element 11 is reset and the configuration information stored in the information storage means 120 are read again.

Figure 3:
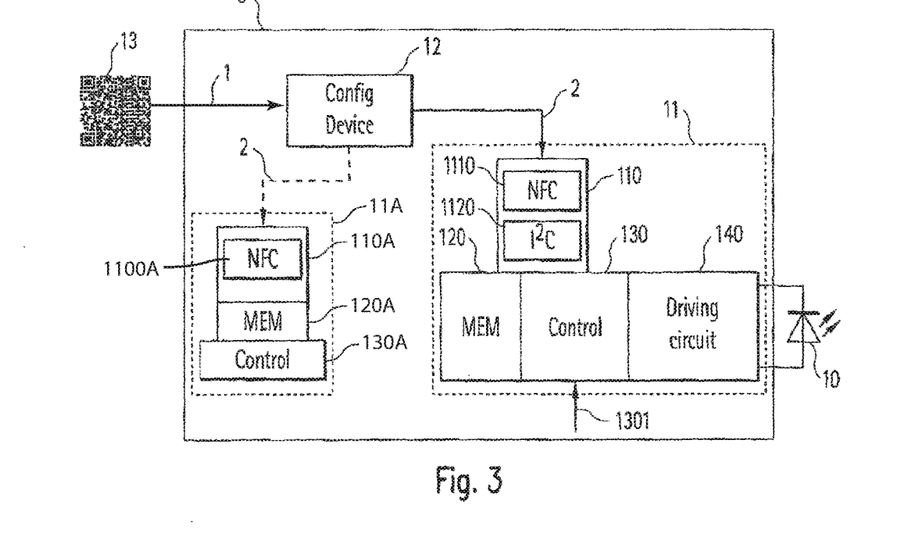
FIG. 3 shows an exemplary embodiment of a configuring system for a lighting system according to the invention.

In FIG. 3 a first exemplary embodiment of a lighting system 9 is shown. The lighting system 9 is able to supply at least one lighting means 10 by an active electronic element 11, which is a ballast of the lighting means 10. Thus, the ballast comprises a driving circuit 140, which is controlled via a controlling unit 130. To control the driving circuit 140, an information storage 120 is used to store configuration information. For commissioning such a lighting system 9, the configuration information has to be stored in the storage 120.

According to the invention, this configuration information is retrieved from a machine-readable medium 13 in a retrieving step 1. Therefore a configuring device 12 is used. This configuring device 12 might be a configured smart phone, which uses its camera as a means for optically obtaining the configuration information contained in the machine-readable medium 13. The configuring device 12 may also be a dedicated handheld programmer device with a display and means for retrieval of configuration information from a machine-readable medium 13 and transmission to the ballast 11 and vice versa.

Alternatively and not shown in FIG. 3 the machine-readable medium 13 can be a device using electromagnetic fields to wirelessly transfer data, e.g. a NFC tag or RFID tag. The configuring device 12 therefore may comprise a communication interface for wireless electromagnetic communication such as an NFC or RFID communication interface for retrieving the configuration information from the machine-readable medium 13. The machine-readable medium 13 may comprise a memory, e.g. EEPROM or FLASH memory, where various lists of parameters and configuration variants are stored as configuration information. The configuring device 12 sends the configuration information to the ballast 11. Therefore a bidirectional channel is established in a wireless communication technique in step 2. Therefore the electronic element 11 comprises a communication interface 110. According to FIG. 3 the electronic interface 110 comprises a wireless communication interface 1110, which is used to receive the configuration date sent from the configuring device 12. This wireless communication interface 1110 might comprise a storage unit, e.g. EEPROM or FLASH memory, to store the received configuration information.

The machine-readable medium 13 can be a NFC-tag or RFID-tag combined with an optical label such as QR-code where the QR-code may be used for optical information retrieval and the NFC-tag or RFID-tag which comprises a memory may store information which can be altered by the user, e.g. by the configuring device 12.

The configuring device 12 may send and receive configuration information from the ballast 11 via electronic interface 110 in a mode where the ballast 11 is not powered. The configuring device 12 may power the electronic interface 110 through wireless transmission of energy, e.g. by electromagnetic or inductive coupling. The ballast 11 with the driving circuit 140 may be switched of during such transmission. As the electronic interface 110 with the wireless communication interface 1110 may comprise a storage unit it may store the received configuration information in the storage unit.

The electronic interface 110 further comprises a wired communication channel 1120, which might be an I$^2$C-interface or SPI-interface. This wired communication channel 1120 is used to provide the received configuration information to the information storage mean 120 of the electronic element 11. This wired communication channel 1120 is preferably used to provide the received configuration information to a control unit 130 of the electronic element 11 in an operation mode of the electronic element 11. Preferably the electronic interface 110 may read out the configuration information stored in the storage unit of the wireless communication interface 1110 through the wired communication channel 1120 when the ballast 11 is powered. Therefore the configuration information may be read out by the ballast 11 at a later time than commissioning and programming by the configuring device 12 is done. This provides also the option that the configuration information may be read out again at a later time, e.g. after a power failure.

The ballast 11 may control selectively whether electronic interface 110 is supplied during normal operation or not. The ballast 11 may power the electronic interface 110 only at start-up or at repeated intervals and check whether any configuration information has to be read out. If no configuration has to be read out the ballast may stop powering the electronic interface 110 and thereby deactivate the electronic interface 110. Thus the electronic interface 110 may be better protected against failure or influences from outside, e.g. overvoltage. Such deactivation of the electronic interface 110 provides the opportunity that in case that the ballast 11, especially the driving circuit 140 and also the information storage means 120 may be damaged during a failure under operation whereas the electronic interface 110 has a higher change to remain without damage and could be read out at a later time although the ballast 11 itself is damaged. Thus a replacement would be easier as the configuration information could be read out from the electronic interface 110 and transferred to another ballast which shall replace the damaged ballast.

The configuring device 12 might originally not be equipped with a wireless communication interface. In such a case, a wireless communication module is connected to the configuring device 12 in order to obtain wireless communication functionality with the electronic element 11.

Thus, the configuring device 12 can be a smart phone which is customized with a mobile wireless reading device to read and write to NFC-tags or RFID-tags. Therefore, the wireless interface 1110 features integrated wireless, storage and an I$^2$C-interface capability in a single chip. The RFID-interface 1110 complies with EPC global class 1 GEN2 specification. An information storage means 120 such as an EEPROM is capable of storing the configuration information. It is worth noting that the EEPROM 120 can be programmed without an external supply when accessed via the wireless interface 1110. Therefore it is possible to commission the electronic element 11 without having a powered lighting system 9.

The electronic element 11 according to FIG. 3 contains the electronic interface 110. Alternatively (not shown), the electronic element 11 can comprise an external wireless communication module, which is directly connected to a wired communication channel 1120 of the ballast, e.g. at input terminals of an I$^2$C communication channel. The wireless communication interface 1110 is placed on a housing of the electronic element 11 and provides the configuration information to the control unit 130 via its modules memory or via the information storage means 120.

In FIG. 3 another electronic element 11A is also shown, which is a passive electronic element 44-11A and also comprises an electronic interface 110A incorporating a wireless interface 1110A and a memory 120A. A control unit 130A is used in the passive electronic element 11A to control the lighting means 10. Such a passive electronic element can be an electronic wall switch or a photocell or an infrared sensing means. This passive element 44-11A is used to generate a control signal to the control unit 130 of an active electronic element 11 for a respective driving of the light source 10 by driving circuit 140. The ballast 11 may comprise as well a wired interface circuit with terminals for connection to a wired interface 1301 like a wired lighting control bus, e.g. to a DALI bus. The ballast 11 may receive dimming commands by the wired interface circuit.

Figure 4:
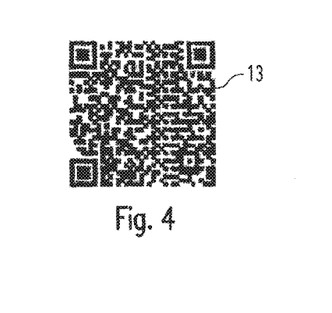
FIG. 4 shows an exemplary embodiment of a machine-readable medium according to the invention.

In FIG. 4 a machine-readable medium 13 is shown. Here, the machine-readable medium 13 is a QR-code. This QR-code can feature at least 20 bytes of configuration information relevant to the electronic element 11.

Figure 9:
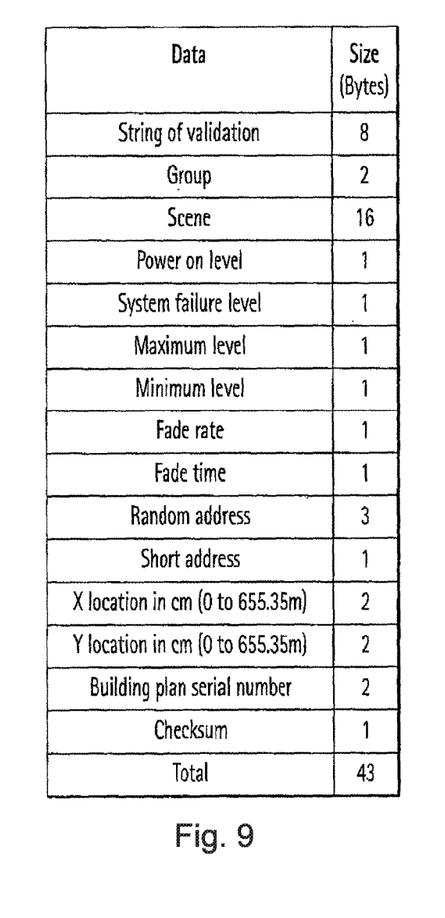
FIG. 9 shows an overview of configuration information according to the invention.

In FIG. 9 the included information is listed with the appropriate size. Such information can easily be read via the configuring device 12 by using its camera or an appropriate QR-code scanning device. Such configuration information can for instance be the group of lighting means 10, the scene in which the lighting means 10 should operate the power-on level, the system failure level, a maximum and a minimum voltage level as well as fading time and fading rate. Especially the address information of the specific electronic element 11 and a location in X and Y coordinates according to the digitized lighting system map is shown. According to FIG. 9, a total of 43 bytes are included in a machine-readable medium according to FIG. 4.

Figure 10:
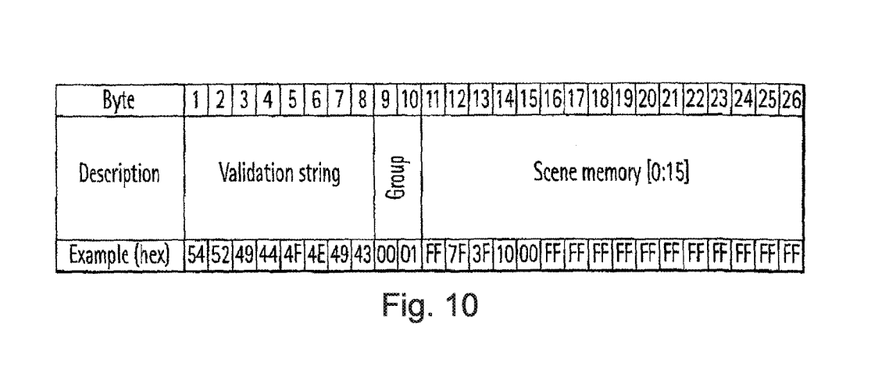
FIG. 10 shows an exemplary embodiment of configuration information retrieved from a machine-readable medium.
Figure 11:
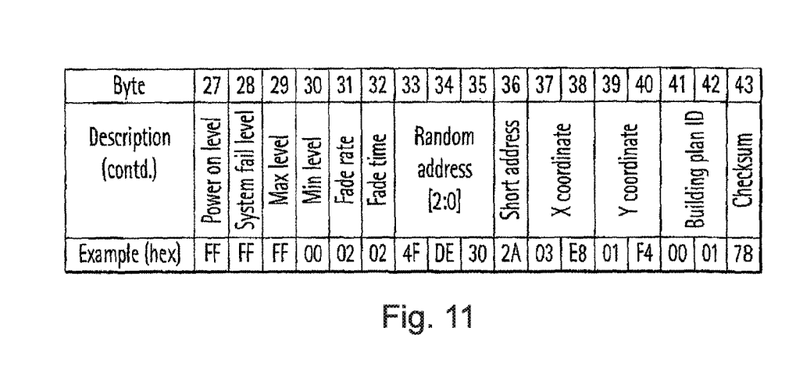
FIG. 11 shows a second exemplary embodiment of configuration information retrieved from a machine-readable medium.

FIG. 10 shows exemplary embodiments of a validation string, and a scene memory is shown. The specific configuration information is hexadecimal coded. FIG. 10 is completed with bytes as shown in FIG. 11.

A computer program product can be used to retrieve the configuration information read from the QR-code 13. The wireless communication interface 1110 of the electronic element 11 can be obtained by a smart phone and tablet PC standard 3.5 mm audio-connector, which can be reconfigured as a NFC- or RFID-interface. Therefore the configuring device 12 can easily be equipped with the wireless communication module and can easily communicate with the electronic element 11.

In an alternative or extended embodiment the configuring device 12 may comprise an equipment to perform 3D location position retrieval such as a camera and linked recognition software where the position of an object like a luminaire or lighting unit in a building can be located. The 3D location position retrieval may be also performed with the aid of a positioning system of the configuring device 12 which may be a GPS system or indoor location system, e.g. a system transmitting universally unique identifiers using radio frequency signals or modulated light signals for retrieving a location position. Such location information of luminaires or lighting units may be stored in a database whereby each electronic element is registered as well, e.g. each electronic element is part of a luminaire whereby all positions of the luminaires are stored in the database as well as all positions of the electronic elements. Thus the configuring device 12 may detect which luminaire and thus which electronic element 11 inside this luminaire is currently selected, e.g. by aid of the camera. Based on the selection the configuration information relevant to the electronic element 11 may be retrieved by the configuring device 12 and send to the electronic element 11 according to the invention.

Figure 5:
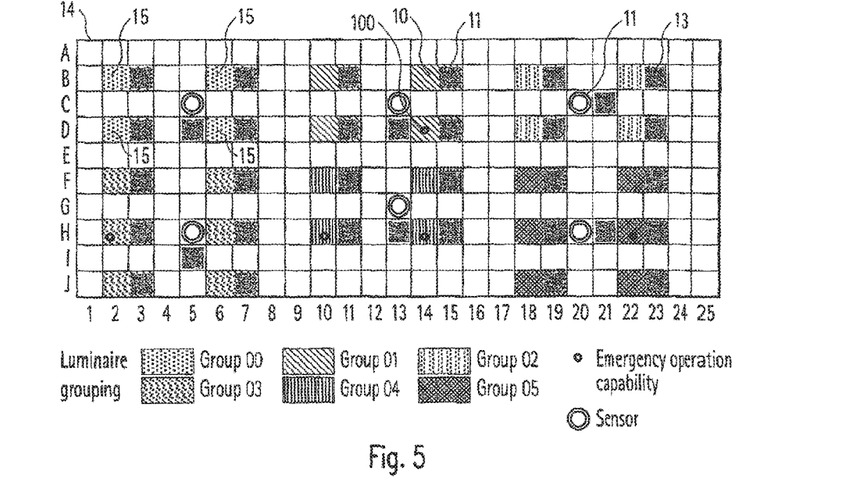
FIG. 5 shows an exemplary embodiment of digitized lighting system map according to the invention.

In FIG. 5 an exemplary embodiment of a lighting system map 14 is shown.

Figure 8:
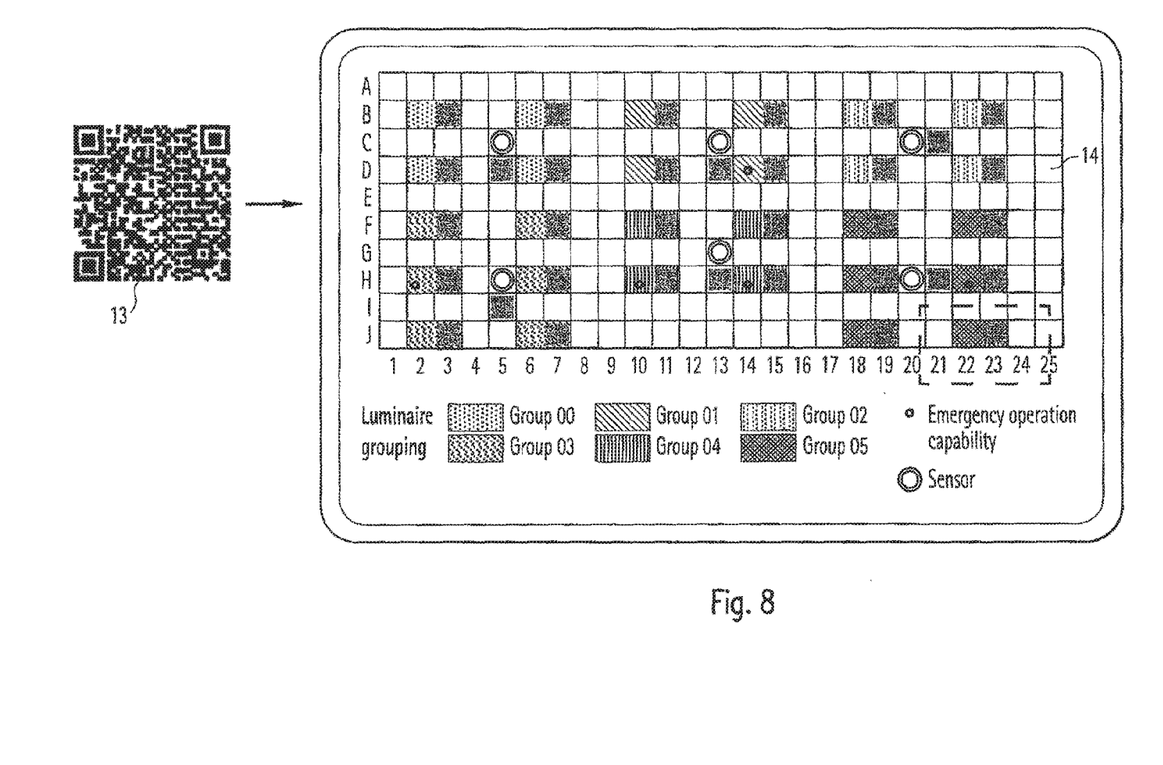
FIG. 8 shows an exemplary embodiment of the configuration of a lighting system map according to the invention.

The ultimate goal of the invention is to use digitized machine readable media 13 as a basis to obtain the configuration information. So the installer does not have to scan any QR-codes 13 from a physical map, such as a printed paper. Instead, all the configuration information would be generated as a layer of a digitized lighting system map 14. A set of digital files are downloaded to a configuring device 12 before the installer begins. This is shown in FIG. 8 wherein the process is made even more intuitive, since the user would select a lighting means 10 by tapping on a screen of the configuring device 12, e.g. a portable computer device, such as a tablet PC or a smart phone. After tapping, the configuration information is sent to the electronic element 11 using the configuring device.

The digitized lighting system map 14 of FIG. 5 comprises five groups 15 of lighting means 10, which are shown with different textures. Each specific group 15 is controlled via at least one electronic element 11. Therefore it is important that each electronic element 11 obtains configuration information in which the specific grouping ID is set.

In FIG. 5 the specific lighting means 10 and the appropriate electronic elements 11 are shown on the digitized lighting system map 14. The electronic element 11 can be an active electronic element 11, such as a ballast or driver or a passive electronic element 11A, such as a sensing means or a switching means. According to FIG. 5 the sensing means are shown as circular symbols. Each specific lighting means 10 comprises an electronic element 11 which needs to be configured using the digitized machine-readable medium 13 which is placed next to the electronic element 11 in the map 14. Each electronic element 11 according to the lighting system map 14 comprises positioning information which mainly refer to X and Y coordinates of the map 14. The positioning information of the digitized lighting system map 14 are also sent as configuration information to the specific electronic element 11.

Figure 6:
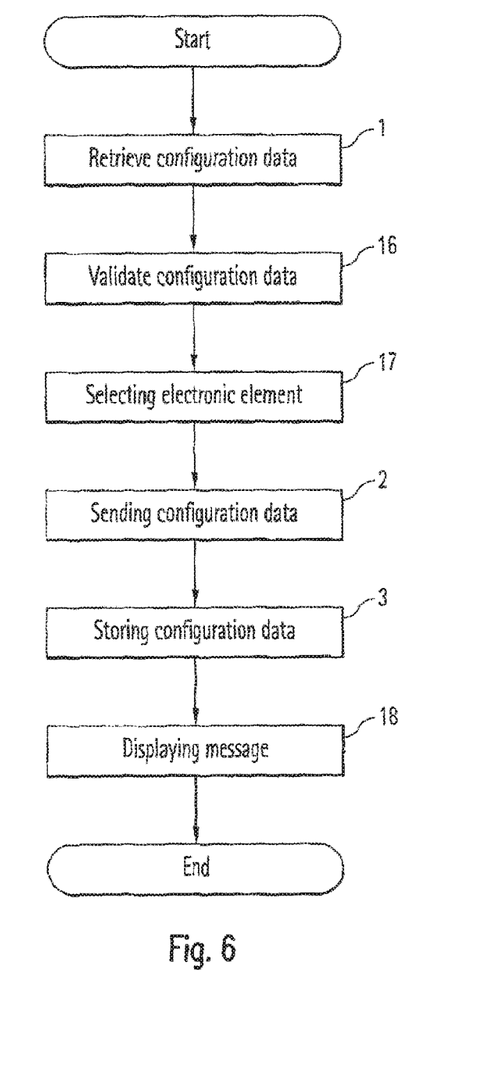
FIG. 6 shows an exemplary embodiment of a method for sending configuration information using a configuring device according to the invention.

In FIG. 6 an exemplary embodiment of a method for sending configuration information using a configuring device 12 is shown. Therein also the retrieving step 1 is used. After retrieving 1 of the configuration information, a validation step 16 is used to validate the configuration information of the machine-readable medium 13. The validation step 16 is used for security reasons and to avoid configuration information which is inoperable with the chosen electronic element 11. After validating 16 of the configuration information the user selects an electronic element 11 in the selecting step 17. Therefore the user or installer needs to place a configuring device 12 in communication vicinity to the electronic element 11 in order to allow an establishing of a bidirectional channel to wirelessly communicate with the configuring device 12. If an electronic element 11 is selected, the configuration information is sent via sending step 2 and is stored according to storing step 3.

In case a failure occurs, the configuring device 12 obtains an error code. The error code generates an error message on the screen of the configuring device 12 in displaying message step 18 to warn the user that the configuring method was not successful.

In case no failure occurs, the configuring device 12 obtains a confirmation code. The confirmation code generates an display message on the screen of the configuring device 12 in displaying message step 18 to inform the user that the storing step 3 was successful.

In case more than one electronic element 11 is in communication vicinity to the configuring device 12, more than one electronic element 11 might respond to the configuring device 12. Thus, the user needs to select a specific electronic element 11. Normally the device with the highest number of responses is likely to be chosen. Alternatively, an ID of the electronic element 11 is transmitted, which is used to verify the correct electronic element 11 automatically.

According to FIGS. 7a to 7g, different smart phone display information of a graphical user interface is shown. Therefore the smart phone as configuring device 12 comprises a display to display the stage of the configuring method.

Figure 7A:
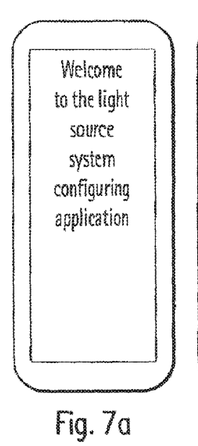
FIGS. 7a-7g show exemplary embodiments of a graphical user interface based on a computer program product executed in a configuring device according to the invention.

According to FIG. 7a, the configuring method is started by starting a lighting system configuring application stored as a computer program in a storage means of the configuring device 12. Upon starting of the application, a respective display information informs the user that the application has been started.

Figure 7B:
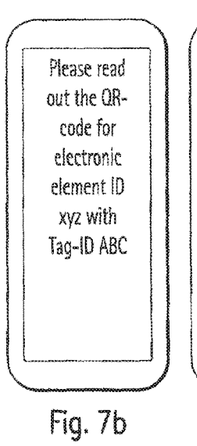

After starting the application, the user is asked in FIG. 7b to scan a specific machine-readable medium 13 to retrieve the configuration information in the retrieving step 1. In dependence on the used machine-readable medium 13, either an optical retrieving or an electronic retrieving of the configuration information is made by respective means of the configuring device 12.

Figure 7C:
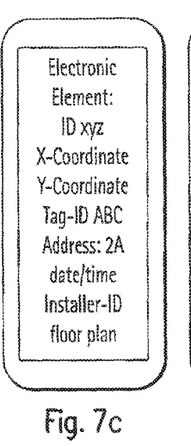

The information retrieved from the machine-readable medium 13 are displayed on the screen of the configuring device 12 according to FIG. 7c. Therefore the application is configured to convert the retrieved configuration information user into user readable configuration information. For instance the address information, the positioning information, the tag-ID, the date/time of retrieving is displayed on the screen. The information is displayed for validation purposes.

Figure 7D:
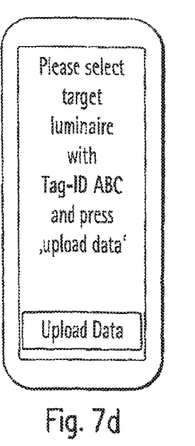

Referring to FIG. 7d, the user has to select a specific electronic element 11 in order to update the retrieved configuration information to the electronic element 11. Therefore the user needs to approach the communication vicinity of the electronic element 11. In case the communication vicinity is reached, the user is asked to upload the information to the electronic element 11. The upload step implies that the configuration information is sent via the wireless interface 1110 to the wireless interface 1110 of the electronic element 11.

Figure 7E:
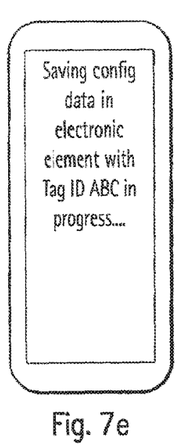

During the sending step 2, the user is informed that the sending is in progress, see FIG. 7e.

Figure 7F:
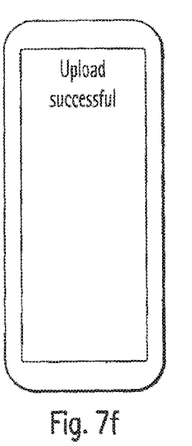
Figure 7G:
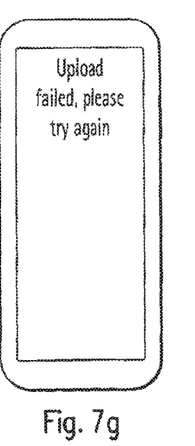

Referring to FIG. 7f, a display message is generated according to displaying message step 18 to inform the user that the storing of information was successful or in case a failure occurs that the configuration information are not stored successfully, see FIG. 7g. Upon receiving a failure message, the user can try to resend the retrieved configuration information or cancel the configuring method.

Since the configuration information are stored in a information storage unit 120 without powering the electronic element 11, no supply voltage is required to read and write to the storage unit 120. Thus, an offline commissioning method is obtained. A contactless uploading via a wireless interface 1110 is possible and coordinates in parameters inside the electronic element 11 can be stored. This allows the easy replacement of an electronic element 11 and using the storage unit 120 as an archive to reconfigure the electronic element 11 in case of a failure.

The configuring device 12 may be used to read out the stored configuration information and optionally additional information like operation, service and maintenance information stored in a information storage unit 120 of a first electronic element 11 and store the read out information inside the configuration device or may forward it to a central light management device or central light management server or central light management database which may be e.g. a cloud service. The configuring device 12 may also be used to read out the stored configuration information and optionally additional information like operation, service and maintenance information stored in a information storage unit 120 of a first electronic element 11 which shall be replaced and may write this information to another second electronic element 11 which shall replace the first electronic element.

To allow an easy communication with the wireless electronic interface 1110, a specific wiring should be used for providing an antenna in order to reach the electronic element 11 in a convenient manner. For instance an antenna in horizontal extracts the vicinity for communication to 10 to 20 centimeters. In case the wired antenna is placed vertically on the metallic case, a communication vicinity of 20 to 30 centimeters can be obtained. The housing for the electronic element 11 may comprise a metallic case configured to shield the electronic element. The shielding prevents an external electromagnetic radiation to electronically disturb the electronic element. Additionally, the shielding prevents other electronic devices to get disturbed by electromagnetic radiation, generated by the electronic element. Thus metallic housings are common for electronic elements in lighting systems. If the wired antenna is placed close to an opening of the metallic case the performance of the communication may be improved. As a part of the electronic element like the end of the printed circuit board and/or the terminals may protrude out the metallic housing the antenna may be placed close to the terminals or at an end of the printed circuit board. Such placement of the wired antenna on the printed circuit board would be preferably a vertical placement close on the metallic housing or nearby outside.

As already stated the communication between electronic interface 110 and configuring device 12 may be a bidirectional communication where both communication interface 110 and configuring device 12 are able to receive and send information from each other. Thus the configuring device 12 can also receive information from the electronic interface 110 and thus may read out the stored configuration information as well as additional information like operation, service and maintenance information, e.g. number of switching cycles, time of operation, nominal operation parameters like nominal lamp current, maximum operation parameters like maximum operating temperature, battery cycles, power consumption, last dimming level, error messages, device failures, abnormal supply voltages etc.

The access of the configuring device 12 to the electronic interface 110 may be performed with different levels of access rights. As one example the manufacturer may have full access to the information storage means 120 and may read and write the whole information storage means 120. In difference to the manufacturer other users may have only limited rights to access the information storage means 120. The access for the manufacturer to the information storage means 120 may be locked with a specific manufacturer code which is only available to the manufacturer of the electronic element 11 or its authorized personnel.

For other users there may be only restricted access to the information storage means 120 possible. For instance a luminaire producer may have access only to certain parts of the information storage means 120 and thereby may only read out and write certain parts of the configuration information (e.g. addressing) and operational information (e.g. lifetime or lamp current setting). Such access to certain parts of the Information storage means 120 may be only locked with a user code which might be only available to certain users which may receive the user code from the manufacturer of the electronic element 11. The access to certain parts of the information storage means 120 may be based on the data written by the manufacturer of the electronic element 11 to the information storage means 120. For instance the programming of the information storage means 120 by the manufacturer of the electronic element 11 may comprise predefined variables for configuration information (e.g. addressing) and operational information which can be modified by the luminaire producer.

There may be also a third level of access possibility to the limited parts of the information storage means 120 which may be accessible for a user without any user or manufacturer code. For instance a change of the address may be performed by unrestricted access to the relevant part of information storage means 120 which is necessary for addressing. An access to restricted areas of the information storage means 120 may be only possible if a manufacturer code or user code is being transmitted first from the configuring device 12 to the electronic interface 110. The electronic interface 110 may check the transmitted manufacturer code or user code and may only enable access to the information storage means 120 when the manufacturer code or user code has been confirmed to be correct.

In one embodiment an access to the complete information storage means 120 may be only be possible by transmission of the manufacturer code and when the electronic element 11 is powered. For example the programming and writing to the complete information storage means 120 may be only be possible by transmission of the manufacturer code and when the electronic element 11 is powered by a defined supply voltage having a specific supply frequency and/or amplitude which is different to the nominal supply for the electronic element 11 (e.g. 160V AC at 60 Hz instead of normal 230V AC at 50 Hz).

In FIG. 8 a digitized lighting system map 14 is shown, wherein the lighting map 14 is displayed on a screen of a portable computer, such as a tablet-PC comprising a touch screen as input means. The QR-codes 13 are thus digitized on the screen and can be chosen easily. The portable computer can furthermore be used as the configuring device 12, wherein for retrieving the configuration information in retrieving step 1, the digitized QR-code 13 is chosen by touching on the screen.

All embodiments described, shown and/or claimed herein can be combined with each.

REFERENCE SIGNS

1 Retrieving step
2 Sending step
3 Storing step
4 Powering step
5 Reading step
6 Configuring step
7 Determining step
8 Reconfiguring step
9 Lighting system
10 Lighting means
    100 Emergency light source
11 Electronic element
    110 Electronic interface
        1110 Wireless communication interface
        1120 Wired communication channel
    120 Information storage means
    130 Control unit
        1301 Another information interface
    140 Driving unit
12 Configuring device
13 Machine readable medium
14 Lighting source system map
15 Lighting group
16 Validating step
17 Selecting step
18 Displaying step

We claim:

1. A method for configuring an electronic element (11) in a lighting system (9), the method comprises the following steps:
    providing a memory (120) in the electronic element (11) capable of storing configuration information when the electronic element (11) is in an unpowered state;
    providing an electronic interface (110) for wireless communication in the electronic element based on a near field communication or a radio frequency identification communication;
    retrieving the configuration information using a configuring device (12);
    establishing a bidirectional channel of wireless communication between the configuring device and the electronic interface;
    wirelessly transmitting energy from the configuring device to the electronic interface when the electronic element is in an unpowered state;
    sending the retrieved configuration information from the configuring device (12) to the electronic interface (110) when the electronic element (11) is in an unpowered state;
    storing the retrieved configuration information into said memory of the electronic element (11) when the electronic element (11) is in an unpowered state; and
    after the storing step, providing power to the electronic element (11) and reading the configuration information from the memory of the electronic element (11) to configure the electronic element (11).

2. The method according to claim 1 wherein the configuration information are retrieved from a lighting system map (14).

3. The method according to claim 2, wherein a graphical user interface is used to display the lighting system map (14).

4. The method according to claim 1 wherein a failure of the lighting system (9) is determined and upon determining the failure of the lighting system (9), the configuration information are read from the memory of the electronic element (11) to reconfigure the electronic element (11).

5. The method according to claim 1 wherein the configuration information comprises at least one of voltage information, temperature information, running cycle information, address information, positioning information, lighting group information, dimming parameter information and fade parameter information.

* * * * *